United States Patent [19]

Shirai et al.

[11] 4,086,185

[45] Apr. 25, 1978

[54] PROCESS FOR ACTIVATING CATALYST FOR POLYMERIZATION OF PROPYLENE BEFORE POLYMERIZATION

[75] Inventors: Isoo Shirai, Chibashi; Takeshi Suzuki; Tsutomu Takahashi, both of Ichiharashi, all of Japan

[73] Assignee: Chisso Corporation, Osaka, Japan

[21] Appl. No.: 666,107

[22] Filed: Mar. 11, 1976

[30] Foreign Application Priority Data

Mar. 11, 1975 Japan .................................. 50-29245

[51] Int. Cl.$^2$ ................................................ C08F 4/64
[52] U.S. Cl. ............................... 252/429 B; 526/140; 526/142
[58] Field of Search ..................................... 252/429 B

[56] References Cited

U.S. PATENT DOCUMENTS

| | | | |
|---|---|---|---|
| 3,029,231 | 4/1962 | van Amerongen | 252/429 B X |
| 3,062,801 | 11/1962 | Hoeg et al. | 252/429 B X |
| 3,067,183 | 12/1962 | Hagemeyer et al. | 252/429 B X |
| 3,530,107 | 9/1970 | Yoshioka et al. | 252/429 B X |
| 3,582,987 | 6/1971 | Natta et al. | 252/429 B X |
| 3,639,375 | 2/1972 | Staiger et al. | 252/429 B X |
| 3,701,763 | 10/1972 | Wada et al. | 252/429 B X |
| 3,793,295 | 2/1974 | Luciani et al. | 252/429 B X |
| 3,937,691 | 2/1976 | Staiger et al. | 252/429 B X |
| 3,951,858 | 4/1976 | Schick et al. | 252/429 B |

*Primary Examiner*—Patrick P. Garvin
*Attorney, Agent, or Firm*—Fred Philpitt

[57] ABSTRACT

A method for activating a catalyst for propylene polymerization before polymerization is proposed. According to this method, a catalyst which has stability at the time of use and reduces the ratio of amorphous polymer at the time of polymerization is obtained. Said method comprises causing a catalyst dispersion prepared by mixing a specified δ-type titanium trichloride composition and an alkylaluminum trichloride in an inert solvent and maintained at a temperature of 10° to 50° C, to absorb a small amount of propylene in an amount of 0.5 to 5 times by weight that of said δ-type titanium trichloride.

4 Claims, No Drawings

PROCESS FOR ACTIVATING CATALYST FOR POLYMERIZATION OF PROPYLENE BEFORE POLYMERIZATION

DESCRIPTION OF THE INVENTION

This invention relates to a method for activating a catalyst for polymerizing propylene prior to polymerization. More particularly, it relates to a method for activating, prior to polymerization, a catalyst for producing crystalline polypropylene which highly inhibits the forming of amorphous polypropylene and elevates the stability of activity of catalyst at the time of use.

It has been well known to polymerize propylene to produce crystalline polypropylene by using a catalyst in which an organometallic compound of a metal belonging to group I to group III of the Periodical Table and a transition metal compound of a metal belonging to group IV to group VI of the Periodical Table in the presence or absence of an inert solvent. When crystalline polypropylene is commercially produced, it is of vital importance to reduce the production ratio of amorphous propylene polymer (hereinafter abbreviated as "app") in the points of economy and disposal of solid waste material. Even such a small reduction as several % per propylene used cannot be neglected and is important from the viewpoint of saving of raw material and saving of energy.

In order to suppress the formation of app, various attempts have been made in the past. Formerly, improvement of catalysts was made based upon a method in which a third component such as amine, ether or the like is added to a combination catalyst of a transition metal compound and an organometallic compound. However, the method which relies on the addition of a third component may reduce the formation of app, but its extent is not notable and has a tendency of reduction of polymerization activity of propylene. Thereafter for the same purpose, improvements have been made by the chemical treatment of catalyst component. For example, a method in which the titanium trichloride-like substance having a composition of $TiCl_3 \cdot \frac{1}{3}AlCl_3$ is subjected to a chemical treatment by acting a complexing agent (see Japanese Patent Publications No. 3024/1967, No. 12810/1968, No. 26385/1972 and Japanese Patent Laid Open Application No. 34281/1973), a modification method in which a complex compound of a complexing agent and $TiCl_4$ is acted upon titanium trichloride (see Japanese Patent Laid Open Application No. 29694/1973), and a method for producing titanium trichloride composition having suprior properties, according to a procedure different from conventional production method of titanium trichloride (see Japanese Patent Laid Open Application No. 34478/1972). These modified catalysts consisting of titanium trichloride composition and an organoaluminum compound have higher polymerization activity and smaller proportion of app formation which are improved to a considerable extent compared with conventional catalyst.

Although these modified titanium trichloride compositions provide improvement in properties, the catalyst prepared therefrom tends to show inferior stability of properties due to the relatively greater change of the improved properties during the time of storage and use in the state of slurry, and it has been often experienced that the proportion of app formation is unexpectedly increased due to the deterioration of catalyst, i.e., reduction in properties, of catalyst, attributable to the unstability of the catalyst during the time of operation of plant for propylene polymerization carried out by using such a catalyst. It has been known as a general tendency of plant operation of propylene polymerization that proportion of app formation increases particularly in continuous process. This drawback is especially notable in case of copolymerization of propylene, e.g., copolymerization of propylene with a small amount of ethylene. This not only increases the raw material requirement (weight of necessary monomer of propylene and ethylene per ton product of crystalline polymer), but also brings about problems of infeasibility of transportation and clogging of filtering material in case of pumping and filtration of a polymer slurry in a polymerization plant and heat loss and reduction in efficiency of apparatus due to adhesion of polymer film onto the walls of vessels, etc.

An object of the present invention is to provide a method by which the stability of properties of polymerization catalyst of propylene at the time of use is increased as a first thing and the proportion of app formed at the time of polymerization is greatly reduced at the same time. Another object of the present invention is to provide a polymerization method which substantially does not require removal of app from crystalline polypropylene when the latter is a product to be produced. A further object of the present invention is to provide a method for activating polymerization catalyst used in the above-mentioned method, before the polymerization. A still further object of the present invention is to provide a method for producing crystalline polypropylene which is easily processed after polymerization and has suprior practical properties. Other objects will be apparent from the description which hereinafter follows.

For the above-mentioned objects, we made study through various kinds of experimentations and found that an activated polymerization catalyst obtained by processing the catalyst system consisting of (i) an improved titanium trichloride composition which has been processed according to a special process, to elevate its properties more than a conventional titanium chloride activated by grinding (e.g., $TiCl_3 \cdot \frac{1}{3}AlCl_3$ AA), and (ii) an organoaluminum compound, exceedingly reduces the proportion of app formation without notably reducing the formation rate of stereospecific polymer and with an extremely good reproducibility of various properties, in the polymerization of propylene, particularly in continuous polymerization, and thus we completed the present invention.

The present invention resides in:

(1) a method for activating a catalyst for the polymerization of propylene before polymerization which is characterized in causing a catalyst dispersion obtained by mixing a δ-type titanium trichloride composition and an alkylaluminum chloride expressed by a general formula $R_nAlCl_{3-n}$ where R is an alkyl having 1 – 4 carbon atoms and $n$ is an integer of 1 – 2, in an inert solvent to absorb slowly a small amount of propylene while said dispersion is maintained at 10° – 50° C, to such an extent that the absorbed amount is 0.5 – 5 times the weight of said δ-type titanium trichloride composition, said δ-type titanium trichloride composition being obtained by reacting a β-type titanium trichloride having a composition of $TiCl_3 \cdot \frac{1}{3}AlCl_3$ or a β-type titanium trichloride containing $AlCl_3$, with a complexing agent or a complex compound consisting of a complexing agent and titanium tetrachloride, followed by grinding the resulting reaction product for activation;

(2) as a first embodiment of the present invention, propylene is absorbed in the substantial absence of hydrogen, in the above-mentioned method (1);

(3) as a second embodiment, the reaction between a β-type titanium trichloride having a composition of TiCl₃.⅓AlCl₃ or a β-type titanium trichloride containing AlCl₃ and a complexing agent or a complex compound consisting of a complexing agent and titanium tetrachloride, is carried out before, during or preferably after grinding of said β-type titanium trichloride having a composition of TiCl₃.⅓AlCl₃ or said β-type titanium trichloride containing AlCl₃, in the above-mentioned method (1); and (4) as a third embodiment, the inert solvent used is a liquid saturated hydrocarbon, in the above-mentioned method (1).

The method of the present invention will be illustrated more fully. (A) a modified titanium trichloride composition, e.g. titanium trichloride composition which is obtained by adding a certain kind of a complexing agent such as butylether or a complex compound consisting of said complexing agent and TiCl₄, to a β-type titanium trichloride having approximately a composition of TiCl₃.⅓AlCl₃ to effect a chemical treatment, and (B) an alkylaluminum chloride e.g. diethylaluminum chloride are added to an inert hydrocarbon solvent to prepare a catalyst dispersion. Then while this catalyst dispersion system is maintained at a temperature in the range of 10° to 50° C, a small amount of propylene is gradually fed in the substantial absence of hydrogen to effect the reaction treatment (i.e. the reaction of propylene itself or reaction between propylene and the catalyst) to effect the activation of the dispersion of polymerization catalyst before polymerization, according to the method of the present invention. At this time, it is preferable to adjust the feeding rate of propylene to 0.02 to 1 part by weight per hour per one part by weight of the above-mentioned titanium trichloride composition, and also adjust the total amount of absorption to 0.5 – 5 parts by weight per one part by weight of said titanium trichloride composition, but another propylene feeding method which provides substantially the same effect e.g. a method for feeding an inert solvent having propylene dissolved therein, at a suitable velocity, a method in which a catalyst dispersion is circulated for passing through a propylene zone (e.g. absorption column), to thereby put the feeding rate and reaction amount substantially in the above-mentioned range, etc. can be employed.

The titanium trichloride composition used in the method of the present invention is obtained as follows:

To a titanium trichloride having approximately a composition of TiCl₃.⅓AlCl₃, obtained by reducing titanium tetrachloride with metallic aluminum or by mixing and grinding TiCl₃ and AlCl₃, is added a complexing agent or a complex compound of a complexing agent and titanium tetrachloride, mentioned below, before, during or after grinding of said composition, to effect reaction. More preferably, the titanium trichloride composition used in the present invention is selected from (A) a modified titanium trichloride composition obtained by activating the above-mentioned composition by grinding and chemically treating the resulting activated composition with a complexing agent such as an organic ether, an organic ketone, an organic carboxylic derivative, etc., as described below in item (i), (B) a modified titanium trichloride obtained by chemically treating said resulting activated composition with a reaction product of the above-mentioned complexing agent and titanium tetrachloride, as described below in item (ii), and (C) a highly activated titanium trichloride composition obtained by treating a β-type titanium trichloride (obtained by reducing titanium tetrachloride with an organoaluminum compound), with a complexing agent such as an organic ether or the like and then reacting with titanium tetrachloride, as described below in item (i).

The complexing agent used to obtain the above-mentioned titanium trichloride to be treated is selected from the group consisting of a dialkyl ether represented by the general formula of R—O—R' wherein R and R' are each an alkyl group having 1 – 10 carbon atoms, e.g. diethyl ether, dibutyl ether, diisobutylether, or the like, a polyethylene glycol dialkylether represented by the general formula of R—O—(CH₂CH₂O)ₙ-R' wherein R and R' are each an alkyl group having 1 – 4 carbon atoms and n is an integer of 1 – 4, e.g. ethyleneglycol dimethylether, diethyleneglycol diethylether, diethyleneglycol dimethylether, a dialkyl thioether represented by the general formula of R—S—R' wherein R and R' are each an alkyl having 1 – 10 carbon atoms, e.g. diethyl thioether diisopropyl thioether, dibutyl thioether, an alicyclic organic ether represented by the general formula

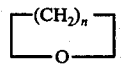

wherein n is an integer of 3 – 5, e.g. tetrahydrofuran, oxetane and an organic ester represented by the general formula RCOOR' wherein R and R' are each an alkyl having 1 – 10 carbon atoms, e.g. ethyl acetate, ethyl propionate, butyl acetate, etc.

In the method of the present invention, (i) at least one compound selected from the above-mentioned group may be used in an amount of 0.001 – 0.5 mol based on one mol of a β-type titanium trichloride, and reacted therewith at room temperature to 100° C in the presence or absence of an inert solvent, and thereafter unreacted complexing agent may be separated; or (ii) a complex compound of at least one compound selected from the above-mentioned group and titanium tetrachloride may be used in an amount of 0.001 – 0.5 mol based on one mol of a β-type titanium trichloride, and reacted therewith at room temperature to 100° C in the presence or absence of an inert solvent, and thereafter unreacted complexing agent may be separated; and in the above-mentioned item (ii), the at least one compound selected from the above-mentioned group may be used in an amount of 0.1 – 10 mols based on one mol of titanium tetrachloride.

However the reaction ratio of titanium tetrachloride and said complexing agent and the addition ratio of the resultant product to the above-mentioned titanium trichloride composition can be optionally set so far as they are not harmful to the effect of the present invention, although the conditions described in item (ii) are preferable.

The alkylaluminum chloride used in the method of the present invention is a compound represented by the general formula of $R_nAlCl_{3-n}$ wherein R is an integer having 1 – 4 carbon atoms and n is an integer of 1 – 2 and includes dialkylaluminum chloride, alkylaluminum dichloride and alkylaluminum sesquichloride. For example, diethylaluminum chloride, dipropylaluminum chloride, diisobutylaluminum chloride, ethylaluminum sesquichloride, ethylaluminum dichloride, etc. can be mentioned. Among them, dialkylaluminum chloride and diisobutylaluminum chloride are preferable.

It is possible to add to a combination catalyst of titanium trichloride composition and dialkylaluminum chloride, an electron donor substance as a third component, such as a polyether, an organic amine, an organic phosphorus compound, a thioether, etc. For example, diethylene glycol dimethylether, triethylamine, tri-N',N'-dimethyl-phosphoroamide in an appropriate amount can be added.

For the inert solvent of the present invention, a liquid non-polymerizable hydrocarbon e.g. n-pentane, n-hexane, n-heptane or the like is used. Every such a solvent is used after removing substances harmful to polymerization, by purification such as dehydration, desulfurization or the like.

If the temperature at the time of propylene absorption in a catalyst dispersion is lower than 10° C in the activation treatment of the catalyst before polymerization, the feeding rate of propylene must be reduced. This is not practical because the time required for the absorption treatment becomes too longer. Even at a temperature lower than 10° C, the feeding rate of propylene can be elevated e.g. by pressurizing. However, in that case, the initial polymer formed by the reaction of propylene for the first time tends to have too high a molecular weight and is mixed with the polypropylene product formed afterward in regular polymerization, resulting in a cause of lack of uniformity of the product. Such a product is not preferable because the processing properties of products are injured by forming fish eyes in case of processing of said products into films or the like. An absorption temperature higher than 50° C is also not preferable, because a feeding rate must be elevated in order to effect uniform absorption. This not only makes it difficult to effect slow treatment but also turns treated catalyst particles to the state liable to agglomerate. On this account a transportation pump used to send the treated catalyst slurry to polymerization vessel in the continuous polymerization is liable to be clogged. To make the matter worse decidedly, if such a high temperature is used in the absorption treatment of propylene, the principal object of the present invention, i.e., retaining the effect of reduction in production ratio of app when the catalyst prepared according to the treatment of the present invention is used for polymerizing propylene, is no more attainable.

As for the propylene used in the activation treatment of a catalyst dispersion before polymerization according to the method of the present invention, it can be of a grade (purity) usable in usual commercial polymerization, but it is surprising that the catalyst which has been subjected to the following treatment is not effective. When the above-mentioned catalyst dispersion is treated with a mixture of propylene incorporated with 10 vol.% hydrogen, the polymerization of propylene carried out by using the above-mentioned catalyst for polymerizing propylene, having been treated with above-mentioned mixture of propylene does not reduce the formation ratio of app, i.e., the formation ratio of app is same with that in case of no treatment. As the result of detailed study of this fact, it has been discovered to be necessary to maintain the hydrogen content in propylene at 1 vol.% or less, preferably 0.1 vol.% or less. It is most desirable to carry out the treatment in substantial absence of hydrogen.

Feeding rate of propylene less than 0.02 part by weight per hour per part of titanium trichloride composition in the activation treatment of the catalyst of the present invention before polymerization, prolongs the time required for treatment and is not practical. Further if feeding rate is greater than 1 part per hour, propylene reacts with the combined catalyst, the molecular weight of resulting initial polymer becomes too large and ultimately gives harmful effect upon the uniformity of the quality of polypropylene products prepared by polymerization of propylene using the resulting catalyst. Such products are not preferable because fish eyes are liable to appear when they are processed into films or the like. The use of a catalyst having been treated by propylene at a feeding rate outside the above-mentioned range of 0.02 to 1.0 part by weight per hour in the normal polymerization of propylene is not preferable because not only the reduction of the formation ratio of app unattainable but also catalyst particles become liable to agglomerate during the polymerization. The presence of an inert gas other than hydrogen e.g. nitrogen, argon, propane, etc. does not give harmful effect to the practice of the present invention.

In the activation treatment of the catalyst of the present invention carried out before polymerization, the amount of propylene used is preferably in the range of 0.5 – 5.0 parts by weight per 1 part of titanium trichloride composition. In the range of less than 0.5 part, the effectiveness of reducing the formation ratio of app is small. In the range of greater than 5.0 parts, the amount of the above-mentioned initial polymer formed increases and the slurry concentration of a catalyst dispersion treated with propylene rises too much. This is not preferable because troubles such as clogging of pipes at the time of transportation to polymerization vessels very often occur.

It is suitable to keep the concentration of titanium trichloride composition in the range of 0.5 – 10% by weight (preferably 5% by weight or less) at the time of addition to the above-mentioned inert solvent. If this concentration is too low, e.g. less than 0.5% by weight, a solvent must be used in an amount more than necessary. In addition, the effectiveness of activation treatment of the present invention is reduced. Thus such low concentration is not preferable. On the other hand, too high a concentration is also not preferable, because the fluidity of catalyst dispersion at the time of transportation to polymerization vessel often becomes poor or insufficient.

It is desirable to use an exclusive absorption vessel or reaction vessel in order to activate the catalyst dispersion for batchwise or continuous polymerization of propylene. In this case, as for a stirring means, a usual agitator will be sufficient. The reaction vessel for this purpose does not require particularly pressure-resisting one. Those having a pressure-resistance to an extent of 1 – 2 Kg/cm$^2$ gauge will be sufficient. It is possible to use a slurry-storage vessel itself, but the adjustment of concentration of catalyst component and the like, the maintenance of a fixed amount of activated catalyst and the like become difficult.

As above-mentioned, it is evident that the kind of the catalyst to be treated and the condition of treatment of propylene are agreeable in order to reduce the formation ratio of app in the production of polypropylene carried out by using the catalyst subjected to the activation treatment of the present invention.

A general method for putting the present invention into practice will be set forth hereinafter.

To a catalyst preparation vessel equipped with a stirrer, a fixed amount of an inert hydrocarbon solvent e.g. n-hexane is fed and the resulting mixture is stirred, then a fixed amount of diethylaluminum chloride is fed and then a fixed amount of titanium trichloride composition is added. While holding the temperature of the catalyst dispersion in the range of 10 – 50° C, propylene is then blown into the catalyst dispersion contained in the catalyst preparation vessel with stirring to effect absorption at a rate of absorption amount of 0.02 – 1.0 Kg/hr per 1 Kg of titanium trichloride composition. When the absorption amount rises to an amount in the range of 0.5 – 5.0 Kg per 1 Kg of titanium trichloride composition, the blowing of propylene is stopped. The catalyst dispersion thus prepared is fed to polymerization vessel batchwise or continuously, depending upon the polymerization process. In the polymerization vessel, propylene, hydrogen and an inert solvent are fed under a fixed condition and a slurry-form polypropylene is produced continuously. From the polymer slurry withdrawn continuously from the polymerization vessel, polypropylene is recovered after purification via various known processes.

According to the process of the present invention, when a homo-polymerization of propylene is carried out in a common batchwise or continuous polymerization vessel by using the catalyst dispersion of the present invention, (1) the stability of catalyst in a catalyst storage vessel is increased (i.e. reduction of capacity with lapse of time and notable reduction of fluctuation of capacity per batch of storage vessel are greatly lessened), (2) the ratio of formation of app is remarkably inhibited without lowering polymerization rate of propylene and it is possible to obtain a value less than 1% relative to the propylene used, and (3) since the molecular weight and viscosity of formed app are low, increase of thermal efficiency and apparatus efficiency of propylene polymerization apparatus can be attained. Further, crystalline polypropylene formed by using the activated catalyst of the method of the present invention and not subjected to elimination of a slightest amount of app, is almost identical in the practical properties to coventional products, and there is no problem upon the use. When the polymerization catalyst activated before polymerization according to the method of the present invention which brings about the above-mentioned notable effect is used for polymerization of propylene, it is possible to obtain all the resulting polymers in the form of so-called crystalline polypropylene product, without subjecting to elimination of app which has to be carried out as an essential operation in conventional, batchwise or continuous polymerization process. In reality, the practical properties of all the polymers (i.e. a product from which a slightest amount of app has not been eliminated) obtained by using an activated catalyst of the present invention are not different from those of commercial polypropylene. Thus it is possible to establish a production process which does not require the separation process of app in batchwise or continuous production apparatus of polypropylene by using an activated catalyst of the present invention and it is possible to reduce the production cost of polypropylene remarkably in view of the increase of efficiency of apparatus. These effectivenesses can be realized by applying the activated catalyst of the present invention also in the polymerization carried out in liquid propylene in the absence of an inert medium as well as in gas phase polymerization.

The present invention will be illustrated based upon various kinds of examples, comparative examples and referential examples hereinafter offered.

Examples 1 – 6 and Referential Examples 1 and 3.

To a catalyst preparation vessel having an inner volume of 1 $M^3$, 500 l of n-hexane purified in advance was charged, a solution of a fixed amount of diethylaluminum chloride in hexane was added, a fixed amount of titanium trichloride or titanium trichloride composition indicated in Table 1 was added with stirring and hexane was added to give a total volume of 700 l. While holding the resulting catalyst dispersion at a fixed temperature, propylene was continuously fed at a fixed rate for fixed hours, for the activation treatment of the catalyst of the present invention. During this time, the temperature of the catalyst dispersion rises by 5°– 10° C due to reaction.

On the other hand, n-hexane and liquid propylene were continuously fed to a reaction vessel having an inside volume of 2 $M^3$ at rates of about 600 l/hr and about 400 l/hr, respectively, in advance, and the liquid level of the reaction vessel was maintained at a constant height by opening or closing a withdrawal valve automatically. Under this condition, the catalyst dispersion prepared by subjecting to the activation treatment of the present invention in the above-mentioned catalyst preparation vessel, was fed continuously to the reaction vessel at a rate of 15 l/hr by a pump. The polymerization reaction was adjusted to the condition of 70° C and 10 Kg/$cm^2$ and a fixed amount of hydrogen was fed continuously for 20 hours to produce polypropylene. The slurry having been withdrawn continuously was freed of unreacted propylene, and deactivated by the addition of alcohol, and at the same time, catalyst residue was separated by extraction from the polymer particles. Finally app and solvent were separated by filtration to obtain crystalline polypropylene powder.

Comparative Examples 1 – 4 and Referential Examples 2 and 4

Polypropylene was prepared under the conditions of Example 1, using titanium trichloride or titanium trichloride composition indicated in Table 1, except that the operation of propylene absorption in a catalyst preparation vessel was deleted.

Explanation of titanium trichloride in Table 1

A: A material obtained by immersing 5 g of $TiCl_3 \cdot \frac{1}{3} AlCl_3$, activated by grinding in 25 ml of n-hexane and 1 ml of $(n-Bu)_2O$ at 60° C for 2 hours to effect reaction.

B: A material obtained by treating $TiCl_3 \cdot \frac{1}{3} AlCl_3$ activated by grinding, with a reaction product of $Et_2O$ and $TiCl_4$.

C: A titanium trichloride composition obtained by the following four steps (a) to (d):
 (a) reducing $TiCl_4$ with a reducing agent expressed by a general formula $AlR_nX_{3-n}$ (descriptions of R, X and n are omitted),
 (b) treating a solid thus obtained, with a complexing agent,
 (c) reacting the solid thus treated with $TiCl_4$, and
 (d) separating the resulting catalyst complex.

D: Commercial titanium trichloride AA. (supplied by Tohotitan, Japan)

E: A material obtained by heat-treating a commercial titanium trichloride under a reduced pressure (100 mm Hg) at 150° C for 1 hour.

lar weight and softening point of app formed in Examples 1 – 6 relating to the present invention are exceedingly reduced compared with those of other examples.

Table 1

| | Catalyst composition | | | Condition for activation of catalyst | | |
|---|---|---|---|---|---|---|
| | Titanium trichloride | Et$_2$AlCl | Additive | Temp. (° C) | treating hour (hrs) | C$_3$= feed/ TiCl$_3$ (kg/kg.hr) |
| Example 1 | A 6 kg | 6 kg | Dig720g | 25–30 | 5.0 | 0.250 |
| Comparative example 1 | A 6 kg | " | " | | | no treatment |
| Example 2 | B 6 kg | 6 kg | | 26–29 | 3.0 | 0.167 |
| Example 3 | B 6 kg | " | | 32–42 | 6.0 | 0.50 |
| Comparative example 2 | B 6 kg | " | | | | no treatment |
| Example 4 | B 6 kg | 3 kg | Dig720g | 25–32 | 5.5 | 0.250 |
| Comparative example 3 | B 6 kg | " | " | | | no treatment |
| Example 5 | C 1.5 kg | 3 kg | | 18–23 | 6.0 | 0.330 |
| Example 6 | C 1.5 kg | " | | 19–26 | 8.0 | 0.500 |
| Comparative example 4 | C 1.5 kg | " | | | | no treatment |
| Referential example 1 | D 7 kg | 6 kg | | 20–25 | 12.0 | 0.066 |
| example 2 | D 7 kg | " | | | | no treatment |
| example 3 | E 7 kg | " | | 28–35 | 5.5 | 0.214 |
| example 4 | E 7 kg | " | | | | no treatment |

| | Polymerization condition and result | | | | | | |
|---|---|---|---|---|---|---|---|
| | Amount of hydrogen Vol % | Stereoregular polymer | | | app | | |
| | | MFR | BD | IR-ζ | Percentage formation (%) | Relative ratio | MW | Softening point |
| Example 1 | 6.0 | 7.1 | 0.44 | 0.920 | 1.2 | 0.35 | 7100 | 114° C |
| Comparative example 1 | 6.0 | 7.5 | 0.36 | 0.912 | 3.4 | | 17000 | 140 |
| Example 2 | 5.0 | 5.7 | 0.45 | 0.920 | 1.08 | 0.28 | 5500 | 109 |
| Example 3 | 6.0 | 7.5 | 0.45 | 0.924 | 0.84 | 0.22 | 7200 | 112 |
| Comparative example 2 | 5.5 | 6.3 | 0.38 | 0.910 | 3.85 | | 16000 | 139 |
| Example 4 | 5.5 | 6.2 | 0.48 | 0.924 | 0.64 | 0.22 | 5900 | 110 |
| Comparative example 3 | 6.5 | 8.5 | 0.35 | 0.924 | 2.90 | | 16000 | 144 |
| Example 5 | 6.0 | 7.2 | 0.55 | 0.913 | 0.60 | 0.25 | 7500 | 108 |
| Example 6 | 5.0 | 4.8 | 0.52 | 0.911 | 0.37 | 0.15 | 6000 | 108 |
| Comparative example 4 | 6.0 | 7.5 | 0.44 | 0.915 | 2.41 | | 16000 | 142 |
| Referential example 1 | 4.5 | 4.0 | 0.40 | 0.912 | 6.8 | 0.72 | 13000 | 128 |
| example 2 | 4.5 | 4.0 | 0.36 | 0.910 | 9.4 | | 25500 | 151 |
| example 3 | 4.5 | 4.0 | 0.41 | 0.927 | 3.6 | 0.47 | 19000 | 133 |
| example 4 | 5.5 | 6.0 | 0.36 | 0.915 | 7.7 | | 32000 | 149 |

Note:
MFR: Melt flow rate, BD: Bulk density, IR-ζ: crystallinity calculated from IR absorption, Relative ratio: Relative value of the percentage formation of app to that in case of no propylene treatment, Dig: Diethylene glycol dimethyl ether Considering the result of Examples and corresponding Comparative examples, the effectiveness of propylene treatment of catalyst dispersion of the present invention upon the reduction of the percentage formation of app is very notable. This tendency is also observed in the result of Referential examples relating to the propylene treatment of catalyst dispersion which is outside the scope of the present invention, but, as seen from the relative ratio of the percentage formation of app, the polymerization examples, in which the activated catalyst system of the present invention is used are superior in the result to the Referential examples. It is seen from the physical properties of formed app that the molecu-

Example 7

The apparatus and the method same with those of Example 1 were employed, and 6 Kg of titanium trichloride composition B and 6 Kg of Et$_2$AlCl were used as catalyst raw materials. Propylene was fed at a rate of 1.5 Kg/hr at 22° – 30° C to carry out treatment for 0.55 hour until the total absorption amount reached 8.25 Kg, whereby an activation-treated catalyst dispersion of the present invention was obtained. By using this catalyst dispersion, the polymerization procedure same with that of Example 1 was carried out to obtain 820 parts by weight of stereoregular polypropylene per unit weight of catalyst. This polymer had a melt-flow rate of 6.4, a bulk density of 0.48 and an IR-ξ of 0.918. The percentage formation of app in this polymerization was 0.72%.

Comparative Examples 5 and 6

Experiments were carried out under the same condition as in Example 7 except that the propylene treatment of catalyst dispersion was carried out in the presence of hydrogen in place of the activation treatment of catalyst dispersion of the present invention. Namely propylene treatment was carried out with the propylene containing 10% by volume of hydrogen relative to the used propylene. When the thus treated catalyst was used in the polymerization, 790 parts by weight of stereoregular polymer per unit weight of the catalyst was obtained. This polymer had a melt flow rate of 5.8, a bulk density of 0.40 and an IR-ξ of 0.920 and app formed in this polymerization was 2.58% (Comparative example 5).

On the other hand when polymerization was carried out with a catalyst treated with a propylene containing 0.1% by vol. of hydrogen, 1.52% of app was formed (Comparative example 6).

As seen from Example 7 and Comparative examples 5 and 6 if hydrogen is present in the operation of propylene treatment, the app-inhibiting effect is lost or reduced.

Comparative Example 7

Experiment was carried out according to the operation same as that in Example 7 except that the treatment of catalyst dispersion with propylene was carried out at a temperature of 70°–75° C, whereby 3.06% of app was obtained. From the results of Example 7 and Comparative example 7, when a temperature higher than the range described in the scope of claim of the present invention is used in the operation of the treatment of catalyst dispersion carried out with propylene, the percentage formation of app increases.

Comparative Example 8

The operation same with that of Example 7 was carried out except that the feeding rate of propylene was changed to 20 Kg/hr/Kg of titanium trichloride composition B in the operation of the treatment of catalyst dispersion carried out with propylene whereby 4.0% app was formed.

From the results of Example 7 and Comparative example 8, it can be seen that the use of higher propylene feeding rate gives higher percentage formation of app.

Examples 9 and 10

Continuous copolymerization of propylene and a small amount of ethylene was carried out by using catalysts prepared according to Examples 3 and 7. The results are shown in Table 2 together with the result of Comparative example 9.

Comparative Example 9

An experiment of copolymerization was carried out by the operation same with that of Example 9 by using the catalyst according to the method of Comparative Example 2.

Table 2

| | Condition of propylene treatment | | | |
|---|---|---|---|---|
| | Temp. (° C) | Treatment time (hr) | Feeding rate of propylene (Kg/hr/Kg TiCl₃ composition) | Absorbed amount per weight of catalyst (Kg/Kg) |

Table 2-continued

| | Temp. (° C) | Treatment time (hr) | Feeding rate of propylene (Kg/hr/Kg TiCl₃ composition) | Absorbed amount per weight of catalyst (Kg/Kg) |
|---|---|---|---|---|
| Example 9 | 22 – 30 | 5.5 | 0.250 | 1.375 |
| Example 10 | 32 – 42 | 6.0 | 0.500 | 3.00 |
| Comparative example 9 | | no treatment | | |

| | Result of polymerization | | |
|---|---|---|---|
| | Melt-flow rate | Ethylene content (%) | Percentage formation of app |
| Example 9 | 6.7 | 2.5 | 3.4 |
| Example 10 | 7.0 | 2.4 | 3.0 |
| Comparative example 9 | 8.0 | 2.5 | 13.4 |

(Note) Catalyst used:
titanium trichloride composition (B) - 6 Kg
Et₂AlCl - 6 Kg From these results, it is preferable that the polymerization catalysts used in the copolymerization which are treated with propylene according to the present method gives extremely low percentage formation of app compared with untreated catalyst.

Example 11

The polymerization catalyst dispersion prepared according to the method of Example 1 was stored in a catalyst storage vessel for 3 days with stirring and then continuously fed to a polymerization vessel and the experiment same with that of Example 1 was carried out. The result is shown in Table 3.

Comparative Example 10

An experiment was carried out in the same manner as in Comparative example 2 except that polymerization catalyst dispersion was stored for 3 days with stirring. The result is shown in Table 3.

Table 3

| | | | Polymerization result | | |
|---|---|---|---|---|---|
| | Whether treatment was carried out or not | Storage time (day) | Stereoregular polymer | | app |
| | | | Melt flow rate | Bulk density | Percentage formation (%) |
| Example 1 | Yes | 0 | 5.7 | 0.45 | 1.08 |
| Example 11 | Yes | 3 | 5.6 | 0.43 | 1.10 |
| Comparative example 2 | no treatment | 0 | 6.3 | 0.38 | 3.85 |
| example 10 | no treatment | 3 | 6.4 | 0.31 | 6.21 |

As evident from the table, the catalyst prepared according to the method of the present invention shows superior stability to the storage in the state of slurry dispersion. This fact shows that properties can be maintained during the common storage time customarily used in the plant operation.

Examples of Use 1 and 2

2,6-ditertiary-butylphenol in an amount of 0.1% was added to the polypropylene powder obtained according to the method of Example 7 and the mixture was extruded at 230° C to form pellets. Further, after killing, extraction and separation of the catalyst, for the polymerization slurry obtained in Example 7, removal of app by separation was not carried out and polypropylene powder obtained by drying was pelletized after addition of 0.1% 2,6-ditertiary-butylphenol. From the resulting pellets, test pieces were prepared and their physical properties were evaluated (Table 4).

It is evident from the table that both the polymers show no difference in practical properties.

Table 4

|  | Example of use 1 containing no app | Example of use 2 containing 0.7% of app |
|---|---|---|
| MFR | 6.6 | 6.8 |
| Tensile strength, ASTMD-638 Kg/cm² | 310 | 312 |
| Elongation, ASTMD-638 (%) | 600 | 610 |
| Flexual modulus, ASTMD-790 (×10⁴Kg/cm²) | 1,300 | 1,298 |
| Stiffness, ASTMD-749 (×10⁴Kg/cm²) | 350 | 345 |
| Hardness (R), ASTMD-785 | 90 | 89 |
| Heat deformation (4.6 Kg/cm²), ASTMD-648 | 100 | 97 |

What is claimed is:

1. The method which comprises
(I) forming a delta-type titanium trichloride composition by
 (A) reacting a beta-type titanium trichloride containing AlCl₃, with
 (B) a complexing agent selected from the group consisting of
  (1) a dialkyl ether represented by the general formula R—O—R' wherein R and R' are each an alkyl group having 1 - 10 carbon atoms,
  (2) a polyethylene glycol diakylether represented by the general formula R—O—(CH₂CH₂O)ₙ—R' wherein R and R' are each an alkyl group having 1 - 4 carbon atoms, and n is an integer of 1 - 4,
  (3) a dialkyl thioether represented by the general formula R—S—R' wherein R and R' are each an alkyl having 1 - 10 carbon atoms,
  (4) an alicylcic organic ether represented by the general formula

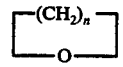

where n is an integer of 3-5, or
  (5) an organic ester represented by the general formula RCOOR', wherein R and R' are each alkyl having 1 - 10 carbon atoms, or
 (C) a complex compound consisting of said complexing agent and titanium tetrachloride, and
 (D) grinding the resulting deltatype titanium chloride composition,
(II) forming a catalyst dispersion by mixing said ground delta-type titanium trichloride composition with an alkyl aluminum chloride having the general formula RₙAlCl₃₋ₙ, wherein R is an alkyl having 1 - 4 carbon atoms and n is an integer of 1 - 2,
(III) activating said catalyst dispersion for the polymerization of propylene in advance of the polymerization which comprises contacting said catalyst dispersion, in an inert solvent, with propylene containing 1% or less by volume of hydrogen while said catalyst dispersion is maintained at 10° - 50° C, said propylene being fed into contact with said catalyst dispersion at a rate of 0.02 - 1.0 parts by weight per hour per part of delta-type -titanium trichloride composition and to such an extent that the amount of absorbed propylene is 0.5 - 5 times the weight of said delta-type titanium trichloride solution.

2. A method according to claim 1 wherein propylene is absorbed in the substantial absence of hydrogen.

3. A method according to claim 1 wherein the reaction between a β-type titanium trichloride containing AlCl₃ and a complexing agent or a complex compound consisting of a complexing agent and titanium tetrachloride, is carried out before, during or after grinding of said β-type titanium trichloride having a composition of TiCl₃ ·⅓AlCl₃ or said β-type titanium trichloride containing AlCl₃.

4. A method according to claim 1 wherein the inert solvent used is a liquid saturated hydrocarbon.

* * * * *